United States Patent
Einecke et al.

(10) Patent No.: US 10,809,960 B2
(45) Date of Patent: Oct. 20, 2020

(54) METHOD AND SYSTEM FOR REPRODUCING VISUAL AND/OR AUDIO CONTENT SYNCHRONOUSLY BY A GROUP OF DEVICES

(71) Applicant: HONDA RESEARCH INSTITUTE EUROPE GMBH, Offenbach/Main (DE)

(72) Inventors: Nils Einecke, Offenbach (DE); Stefan Menzel, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 30 days.

(21) Appl. No.: 16/423,385

(22) Filed: May 28, 2019

(65) Prior Publication Data

US 2019/0361657 A1    Nov. 28, 2019

(30) Foreign Application Priority Data

May 28, 2018  (EP) .................................... 18174573

(51) Int. Cl.
- *G06F 3/14* (2006.01)
- *G06T 7/70* (2017.01)
- *G09G 5/00* (2006.01)
- *G09G 5/14* (2006.01)

(52) U.S. Cl.
CPC .............. *G06F 3/1423* (2013.01); *G06T 7/70* (2017.01); *G09G 5/003* (2013.01); *G09G 5/14* (2013.01); *G09G 2356/00* (2013.01)

(58) Field of Classification Search
CPC ......... G06F 3/1423; G06T 7/70; G09G 5/003; G09G 5/14; G09G 2356/00

USPC ..................................................... 345/1.3, 11
See application file for complete search history.

(56) References Cited

U.S. PATENT DOCUMENTS

| | | | |
|---|---|---|---|
| 9,417,691 B2 | 8/2016 | Belimpasakis et al. |
| 2012/0169734 A1 | 7/2012 | Snavely et al. |
| 2012/0300020 A1 | 11/2012 | Arth et al. |

(Continued)

FOREIGN PATENT DOCUMENTS

WO     WO 2016/155767 A1     10/2016

OTHER PUBLICATIONS

European Search Report dated Sep. 20, 2018 corresponding to European Patent Application No. 18174573.8.

(Continued)

*Primary Examiner* — Amare Mengistu
*Assistant Examiner* — Gloryvid Figueroa-Gibson
(74) *Attorney, Agent, or Firm* — Squire Patton Boggs (US) LLP (57) ABSTRACT

The invention regards a method for reproducing visual and/or audio data synchronously by a group of devices, as well as a system for realizing such method. According to the invention first, a spatial location of each of the devices of the group is determined. Then, the visual and/or audio content is partitioned into content parts, each part dedicated to be reproduced by one device of the group respectively, based on the spatial location of the device. The dedicated portions are transmitted to their associated devices together with a time stamp, and the group of devices reproduces commonly and synchronously the transmitted portions.

23 Claims, 3 Drawing Sheets

(56) References Cited

U.S. PATENT DOCUMENTS

2014/0302773 A1* 10/2014 Jantunen .......... H04N 21/42203
455/3.01
2014/0314322 A1  10/2014 Snavely et al.
2015/0254045 A1   9/2015 Drake et al.

OTHER PUBLICATIONS

DIGINFO TV: "Pinch interface connects the displays of multiple devices simultaneously," DOGINFO TV, Nov. 1, 2012, pp. 1-5, XP054976660.

* cited by examiner

METHOD AND SYSTEM FOR REPRODUCING VISUAL AND/OR AUDIO CONTENT SYNCHRONOUSLY BY A GROUP OF DEVICES

BACKGROUND

Field

The present invention generally relates to a method and system for reproducing visual and/or audio content synchronously by a group of devices. The invention utilizes computers and computer applications, preferably a set of stationary computing units and devices, preferably mobile devices, processing and synchronously reproducing location-bound digital content, like e.g. visuals or audio.

Description of the Related Art

Many state of the art devices comprise high performance computing units and a set of internal sensors, e.g. a global positioning system (GPS), inertial measurement unit (IMU), built-in camera, built-in microphone etc. These devices usually are configured to be used as playback devices, i.e. the devices comprise displays and/or speakers for reproducing digital content. The above-mentioned general structure describes particularly also up-to-date mobile devices. By being portable, these mobile devices can be operated to playback visual and/or audio content to the user. Typically, each playback device refers to a single type of visual and/or audio content to be reproduced and communicated to the user, or refers to a fraction of virtual content.

US2014/0314322 A1 describes a technique for geo localization of images without the need of GPS information. The basic idea is to use a global-scale three-dimensional database. The position of capturing the image and thus the position of the camera is determined with respect to this database. Another approach for determining a location of a camera is disclosed in US2012/0300020 A1. Here, a technique for determining the location of a camera using panoramic images is described. The idea is to compare the features in the panoramic view with features from a 3D model of the environment. Since the panoramic view encompasses more features than a single camera image, the localization quality is strongly improved.

US 2012/0169734 A1 describes a system for browsing images based on their geo location. Instead of selecting images to display based on refined search key words, the user of the system can get a map with locations of the single camera images taken. By these, the user can select more easily a specific view. The reproduction nevertheless is limited to reproduce one visual content per device.

Finally, U.S. Pat. No. 9,417,691 B2 discloses an ad-hoc network of mobile devices for realizing collaborative actions like in a hunting game played by multiple users or a search and rescue scenario. The idea is to distribute the information of position and action areas (shooting, searching) of the different users participating to the other users. This enables, for example, to show all users and their action area on a map for better collaboration of the users. However, this is intended only for information of other players and does not result in different devices commonly reproducing a single content.

SUMMARY

It is therefore an object of the present invention to enable synchronous processing of visual and/or audio content on a group of devices. Each device of the group plays back a part of the content depending on the device's position in space such that the entirety of the devices of the group altogether give a consistent impression of the visual and/or audio content, which is reproduced in a collaborative manner by the devices of the group.

The object is achieved by a method and system according to the independent claims. Further advantageous aspects and features are defined in the dependent claims.

The method for reproducing visual and/or audio content commonly and synchronously by a group of devices according to the invention comprises the following steps: At first, spatial locations of each of the devices of the group are determined. Having the spatial locations of the devices in particular means that their positions (preferably including orientation) relative to each other are known. Then, based on the locations, the visual and/or audio content is partitioned into content parts, each content part dedicated to be reproduced by one device of the group, respectively. The dedicated content parts are then transmitted to their associated devices together with a time stamp so that the transmitted parts reproduced commonly and synchronously by the group of devices are reproduced synchronously. The resulting reproduction of the content parts generates an impression of one large reproduction device. It is to be noted that the term "partitioning" means that a fraction of the virtual content that corresponds to a device is extracted from the entire virtual content. In case of a visual this also means that not all of the virtual content is distributed to the devices of the group, because of gaps between the devices' displays.

This is in particular evident for visual content, where different devices display fractions (content parts) of an image or video. The partitioning is then performed such that the fractions of the image correspond to the positions of the devices in a virtual display area spanned by the entirety of the devices of the group. The inventive method, and consequently the corresponding system does not need a predetermined arrangement of the devices. Since the partitioning uses the location information, which is generated by determining the position of each device, the method is particularly useful for dynamic arrangements. One example could be a plurality of mobile devices like cell phones, which can be arranged in various relative positions to each other.

It is preferred that in the method the step of partitioning the visual and/or audio content is performed repeatedly whenever a device joins or leaves the group. Leaving the group in the sense of the invention means that the location of the leaving device changes such that a relation with the rest of the devices of the group cannot be assumed any more. This may be determined based on a relation of the distances between the devices. If, for example, a shortest distance between one device and all other devices of the group exceeds a multiple of the average distance between other devices of the group, then it could be concluded, that the device leaves the group. Vice versa, the same threshold can be used to conclude that a new device enters the group. Other thresholds being a measure of proximity can be used as well.

The invention advantageously relates to visual and/or audio content, which is one of the following: an image, a video, an audio recording, a 3D object file or a virtual 3D space.

Further, it is preferred that the determination of the spatial location is performed based on images shot by the devices' built-in cameras. The big advantage is that such determination is also possible, when a usually used positioning system is not available. Thus, location determination based on images captured by the device itself may be used in buildings, where satellite signal based localization may fail. Further, mobile devices, which are particularly useful for implementing the present invention, in most cases comprise built-in cameras anyway so that an analysis of captured images allows position determination.

The images shot by the devices' cameras advantageously include one or more markers, the location of which is known, and the determination of the spatial location is performed based on the markers in the images. Since such markers are easy to detect in an image and the position of the marker is known a priori, for example by storing the marker associated with precise position information in a database accessible by the devices, the accuracy of position determination may be increased easily.

According to one preferred embodiment, each device captures images for position determination and transmits these images to a central processor. The central processor computes the spatial locations of the devices and sends back location information to the devices. The transmission of the captured images enables use of a central processor for example in a stationary computer. "Central processor" is to be understood as a processor computing the locations at least for a plurality of devices of the group. The computing capability of the central processor is shared between these devices. A plurality of central processors can be used to compute location information for the entirety of devices of the group. Using at least one such central processor external to the devices has the advantage that energy consumption is not critical and thus a processor with very high performance can be used. Since the present invention shall in particular cope with dynamic configurations, which means changing positions and numbers of devices, this has the great advantage that short response times to changes in the arrangement of devices can be realized.

Another way of determining the spatial location uses beacons (beacon signals) emitted by beacon nodes whose location is known. Such analysis of beacon signals can be advantageously used in situations where light conditions are difficult and localization based on captured images is difficult. Sensors for measuring the beacons are included in the devices.

It is furthermore preferred that after an initial determination of the spatial location is made, an update and/or refinement of the spatial location of a device is performed based on data recorded by an inertial measurement unit (IMU) of the device. In case that the computation of the initial spatial location is performed by a remote, central processor as mentioned above, it is then even not critical when connection to this processor is interrupted. On the other side, a second approach to calculate the location of the devices reduces the position error.

It is evident that all or part of the different approaches to determine the spatial location of each of the devices of the group may be combined.

According to one other aspect of the invention, one dedicated device records at least one image by its built-in camera and registers a local coordinate system. The at least one image is shared to the other devices of the group which themselves record images taken by their own built-in cameras, wherein each of the other devices computes its spatial position based on the received images, the received local coordinate system and the own recorded images and transmits its spatial location to the dedicated device. Contrary to having one central processor which calculates the positions of all or at least a plurality of the individual devices of the group, this has the advantage that only the image of one dedicated device, or a plurality of images captured by the same device, needs to be transmitted to the other participating (or participating requesting) devices. Then, each of the devices itself is configured to compute a suitable algorithm in order to determine its position.

The determination of spatial locations of the devices based on images taken by built-in cameras of the devices may be based on computation of an essential matrix and/or fundamental matrix by applying at least one of an eight-point algorithm, a five-point algorithm, RANSAC, bundle adjustment and combinations thereof.

Alternatively, the determination of spatial locations of the devices based on images taken by built-in cameras of the devices is based on computation of structure-from-motion algorithms or multi-view geometry algorithms.

It is preferred that a distribution of the devices of the group is analyzed and the partitioning of the visual content is mapped to the distribution such that at least one feature of the visual content to be reproduced is optimized. Adapting the relative position of an image or video to be reproduced to a virtual display area spanned by the entirety of the devices of the group to the distribution significantly improves the impression generated by a viewer. The best relative position of a visual content to the virtual display generated by the devices of the group thus makes the best use out of a non-equal arrangement of the displays of the devices.

To achieve this optimized mapping of the image to the distribution of devices, the feature of the visual content is computed based on at least one of a local structure frequency, brightness, luminance and colors of the visual content.

The feature of the visual content may be computed in particular based on histograms or a cluster model of one or more of local structure frequency, brightness, luminance or colors of the visual content and the optimization is performed towards cluster or histogram similarity. The cluster or histogram similarity may in particular be calculated based on earth mover's distance or Euclidean distance.

As a result of the optimization, it can be determined, what changes in position of one or a plurality of devices of the group would lead to a further improvement of the mapping. Thus, it is preferred to transmit information on a direction towards a spatial location of the devices that would result in an improved cluster or histogram similarity to the devices of the group. In many scenarios making use of the present invention, a user will hold a mobile device such as a cell phone. Being presented the direction of movement that would lead to an improved reproduction of visual content, the user then could move the device correspondingly and thus actively participate in an improvement. The more devices participate, the better the result will be.

It is particularly advantageous to determine first a virtual display area, which is determined as an area that is spanned by the devices of the group. Having determined such virtual display area, the visual content is partitioned based on the location of the device within the virtual display area and the size of the device. The size of the device could be a set size, which is a priori set for each of the devices. Alternatively, the size could be determined for each of the devices based on information, which is given by the respective device. For example, when a device wants to register to the group it could be mandatory that the device transmits information on its display, including at least a size of the display.

Further, in case of audio content to be reproduced, it is also advantageous to determine a virtual display area first, which is spanned by the devices of the group. Then, the audio content is partitioned based on the location of the device within the virtual display area.

The audio content may be music and each part of the audio content may correspond to one instrument. Such reproduction of audio content generates an impression of an orchestra being present, because contrary to ordinary stereo reproduction, each instrument (or maybe a plurality of instruments forming a sub group of the entire orchestra or the like) can be reproduced individually by one device. Therefore, the origin of the sound corresponds to reality much more.

According to another aspect, parts of the audio content are processed individually so that audio beamforming or wave field synthesis is achieved by the entirety of the devices of the group.

A preferred way to determine a virtual display area with corner points is computing the corner points with a convex-hull algorithm.

According to another advantageous aspect, all of the content parts are transmitted to each of the devices of the group, wherein for each of the content parts information is added that allows identification of an associated device, and each device reproduces its dedicated content part. This has the big advantage that no addressing of content to the individual devices is necessary, so the content parts can be broadcast and each device further processes only the part relevant for this device Synchronization of reproduction is based on a network time protocol preferably. Using the network time protocol enables a common time base for all the devices of the group and thus provides in a simple way the basis for synchronous reproduction of the virtual content.

The system corresponding to the method for reproducing visual and/or audio content synchronously, comprises a group of devices and a central processor commonly used by at least a plurality of the devices, wherein the devices and processor are configured to execute the above mentioned method steps with the processor being configured to execute the partitioning of the virtual content.

Whereas it is possible that the processor performing the partitioning is a processor separate from all the devices used to reproduce the content parts, it is also possible that the commonly used processor is included in one of the devices of the group. The advantage is that even without a separate central processor that needs to communicate with each of the participating devices, it is possible to establish such reproduction system. As one of the devices has a processor configured to do the partitioning, an ad hoc system for reproduction of content in line with the inventive method can be established anywhere.

BRIEF DESCRIPTION OF THE DRAWINGS

The invention will now be explained with respect to preferred embodiments, which are illustrated in the annexed drawings in which.

DETAILED DESCRIPTION

Below, embodiments of the invention will be described and with respect to some embodiments, only details will be explained. Thus, to improve a general understanding of the invention the idea of the invention shall be illustrated first. Generally, synchronous playback of visual and/or audio content on an adaptive entirety of devices shall be enabled. Such visual and/or audio content may also be referred to as virtual content hereafter. The system comprises a group of devices, each device configured to be able to reproduce visual and/or audio content using a display and/or speakers that are built-in the device. Of course, the invention may be used with a plurality of stationary devices for reproduction, but the main field of use is with mobile devices, because here a dynamic change of the mobile devices belonging to the group commonly reproducing a virtual content may occur. In the following, explanations will be given exclusively for such mobile devices, but it is evident that all these aspects and features may also be applied to non-mobile devices.

Each mobile device according to the invention is identified and registered as belonging to the group by its spatial location within the entirety of mobile devices and assigned a content part of the virtual content depending on said spatial location. By synchronizing the reproduction of the content, parts of the virtual content on each mobile device of the group, a large portion of the entire virtual content, if not even the complete virtual content, is reproduced, in case of visual content displayed. In a real-time fashion, mobile devices may enter or leave the group commonly reproducing the virtual content. Such entering or leaving is processed for adapting the size of the virtual display established by the group of devices when necessary, and content parts of the virtual content are also adapted. In case of a visual, e.g. an image or a video, the entirety of the mobile devices display only small fractions of the visual (content parts) while each of the mobile devices may only process a portion of the visual as low as down to one pixel (or even subpixels) rescaled to the display size of the mobile device. In case of audio, each mobile device may play a portion of the audio pre-specified to a certain location in space, or each mobile device may play one instrument of the audio arrangement pre-specified to a certain location in space.

Figure 1:
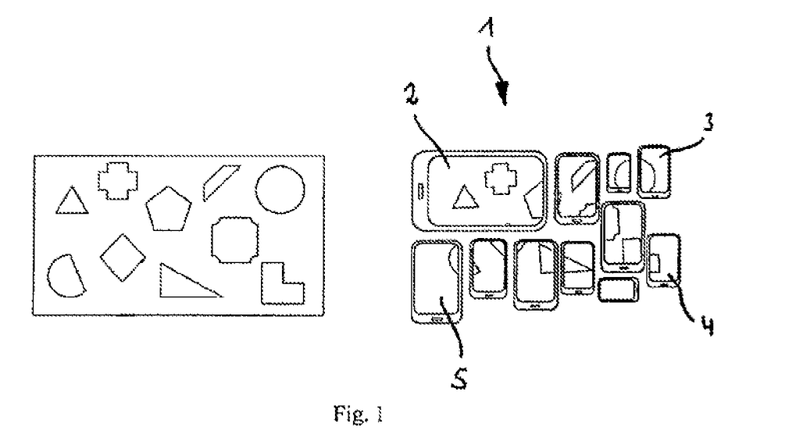
FIG. 1 shows virtual content and its reproduction by a group of mobile devices, FIG. 2a) and FIG. 2b) illustrate an aligned arrangement and non-aligned arrangement of mobile devices forming an ad-hoc large display screen.

FIG. 1 illustrates the principle of the invention. On the right side, a group 1 of multiple devices creates a so-called large ad-hoc screen for visual and audio playback experience. In the example, the group 1 comprises eleven so called smart phones as mobile devices. Of course, the number of devices is not limited to eleven and less but also more devices can be in the group 1. For illustrating purposes only, reference numerals are shown in the drawing for the mobile devices 2, 3, 4 and 5, which are closest to corners of a rectangular virtual display area 7 shown in FIG. 2b). The virtual display area 7 is an area that is spanned by the mobile devices 2, 3, 4 and 5 of the group 1. This virtual display area 7 shall be used to reproduce a visual content as it is shown in FIG. 1 on the left side. The exemplary embodiment shows an image with a plurality of objects. According to the invention, parts of the image are displayed on the displays of the mobile devices 2, 3, 4, 5 as can be seen in FIG. 1 on the right side. Due to the gaps between the devices' displays, the group 1 of devices will reproduce only a fraction of the entire visual content, but as long as a density of mobile devices 2, 3, 4, 5 in the group 1 is large enough, this will be sufficient to resemble the virtual content.

An implementation of the invention to reproduce virtual content by the devices of the group 1 includes repeating the steps of computing the locations of each device, registering each device by location, preparing for each device the content part to be reproduced, sending the data corresponding to the content part to each device and reproducing the content part on each device. A common time basis is used for all devices reproducing a virtual content so that synchronous playback of, for example, a video is enabled. One aspect of the invention is the adaptation of the content to be played under a changing number of participating devices. As mentioned above already, this means that spatial locations of the devices are determined repetitively, so that partitioning the virtual content to be reproduced is possible always such that the devices currently forming the group 1 are reproducing a portion of the virtual content corresponding to their current position in the virtual display area 7. The repetitive determination of the device locations may not only be used to identify leaving or entering devices but also changes of device positions within the group 1 and thus the virtual display area 7.

As possible application scenario, a music show or sports event may be imagined where visitors in the stands may hold their mobile devices 2, 3, 4, 5 with, e.g., the display direction facing visitors on the opposite stands, so that the entity of displays forms a large ad-hoc screen, and images or live video coverage is shown on the large ad-hoc screen. By adding or removing mobile devices 2, 3, 4, 5 the size and position of the virtual content is adapted according to the entirety of devices.

Within each of the repetitive steps, a mobile device 2, 3, 4, 5 requesting participation in the large ad-hoc screen has to register and provide its location in space. As standard solution a scan of a local identifier, e.g., a barcode attached to a seat or seat ticket, could be utilized, which however fixes the device's location and prevents an online adaptation during playback. For dynamic solutions, which are the preferred application area and which already have been described above, depending on the required resolution and indoor/outdoor scenario various other methods are applicable. If available, Global Navigation Satellite System (GNSS), inertial measurement unit (IMU) sensors and/or beacon systems provide location information. To increase the accuracy of the location, especially for indoor scenarios, in addition or as a stand-alone alternative cameras of the mobile devices 2, 3, 4, 5 are utilized to record images and process the recorded images of several mobile devices 2, 3, 4, 5 to calculate the locations of each mobile device 2, 3, 4, 5 of the group 1 or requesting participation. Here, the camera of the mobile device 2, 3, 4, 5 is activated and positioned towards objects in the environment, e.g. objects, which are in the direction in which the display should be directed in the reproduction mode. To compute the mobile devices' locations in space the recorded images are sent to a central processing unit. Such processing unit may be realized as a single processor or a plurality of processors. The processing unit in any case needs to be able to exchange information with the mobile devices 2, 3, 4, 5 of the group 1. Depending on the complexity of the overall arrangement of the group 1, it is advantageous to use a processor of one of the devices of the group 1 as the central processing unit. In this case, the central processing unit included in a device of the group 1 assigns a local coordinate system to one of the devices and computes the relative positions of all other participating devices according to this local coordinate system based on the recorded images. To support this process, it is also possible to send an image with an object to each mobile device 2, 3, 4, 5 requesting participation and asking the user to focus this object with the camera to guarantee overlap between images.

Typically and generally known in the art, a location of cameras in 3D space is computed by finding corresponding pixels between images from different cameras or from different camera poses, and using the found correspondences to compute the essential matrix or fundamental matrix. These matrices describe the relative orientation and translation between the camera poses at which the images were taken. Methods for computing the essential or fundamental matrix are, e.g., the eight point algorithm or the five-point algorithm or their variants. For more stable results, also random sample consensus (RANSAC) and bundle adjustment are often used. While RANSAC is able to estimate model parameters by excluding outliers, bundle adjustment increases robustness by combining the estimations of many different images (and thus camera poses) and optimizing for a common plausible solution. The computation for determining a spatial location of each of the devices can be carried out in a distributed manner so that (a) a mobile device 2, 3, 4, 5 requesting location information shares one or more recorded image(s) with another participating device where the location is computed on the subset of devices and location information is sent back, or (b) mobile devices 2, 3, 4, 5 share their recorded images (s) and location information with the device requesting location information, and the computation is carried out on the mobile device 2, 3, 4, 5, which requests the location.

It is to be noted that sharing the images is not necessarily performed for all of the devices currently in the group 1. It is also possible, and in terms of data traffic even reasonable, to use only a subset of devices (or their images) for the localization. The locations of a set of cameras is computed from a set of images captured from these cameras and structure-from-motion algorithms or multi-camera registration can be applied to realize this computation.

An alternate or additional way of determining the spatial location relies on using beacon signals (beacons or short beacons), which are emitted by beacon nodes.

The beacon nodes are arranged at known locations. Each beacon transmits a predetermined beacon signal, for example a wireless beacon signal or a beacon signal via visual light communication (VLC). Sensors for measuring the beacons may be included in the devices (mobile devices 2, 3, 4, 5). The sensors may be wireless receivers or VLC receivers, for example. The received beacon signals are evaluated and a pose information including at least a current location of the devices, and preferably including further information on current orientation of the devices may be calculated from the received beacon signals.

The beacon nodes may be wireless access points. The analysis of the received beacon signals can be performed using existing localization techniques such as Received Signal Strength Indicator (RSSI) and lateration (trilateration) based localization, fingerprinting based localization, Angle of Arrival (AoA) based localization or Time of Flight (ToF) based localization. A combination of these techniques may enhance the accuracy of the calculated location of the device.

Analysis of the received beacon signals and calculation of the location may be performed at at least one of the devices, in particular mobile devices 2, 3, 4, 5, or at a central processing unit.

Such analysis of beacon signals are advantageous in situations and environments, in which light conditions are difficult and localization based on captured images alone is difficult or yields only localization results with a low localization accuracy.

In the field of 3D reconstruction, state-of-the-art algorithms are able to reconstruct 3D models of buildings using unstructured images from the internet. "Unstructured" in this context means images with unknown position of the camera and also with unknown camera specs used for capturing the images. During the process of 3D construction, each camera's 3D position is estimated in order to compute the correct contribution to the 3D geometry of the building. This 3D reconstruction technique is utilized in order to determine the position of the device that, in the group 1, shall reproduce a portion of the virtual content. Instead of internet image data, images from the mobile device cameras are fed into the system. By using this technique the device camera's position and orientation is estimated in a global frame and through this the position and orientation of the whole device since the relation between the camera and the device where the camera is built in is known. The steps of reconstructing the 3D model in the known algorithms are dropped. In some scenarios, it might be beneficial to use additional visual markers with known 3D position and orientation in order to improve the position estimation of the mobile devices 2, 3, 4, 5. Such markers are typical black and white patterns of squares or circles as these are easy to detect.

Based on the information of registered devices, i.e. mobile device identifier and location in space and preferably also the size and maybe even the resolution of the built-in display, the content distribution is computed. Content distribution means, that the content parts that are to be reproduced by an individual device of the group 1 need to be determined, so that synchronized reproduction of the content parts gives an overall impression of the virtual content. Thus, information about the location of a device allows recognizing the role the device plays in the virtual display area.

Figure 2A:
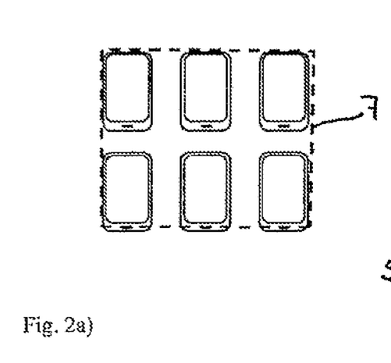
Figure 2B:
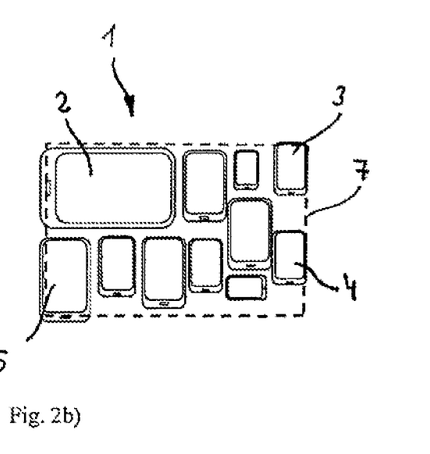
Figure 3:
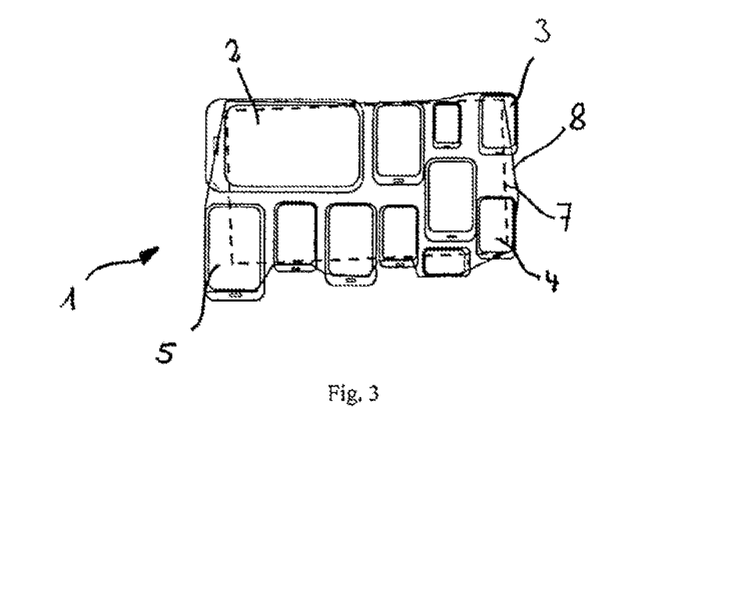
FIG. 3 shows an alternative approach to determine a virtual display area for a given arrangement of devices, FIGS. 4a), 4b) and 4c) show histograms for the virtual content for potential ad hoc-displays, FIG. 5a), 5b), 5c) show three exemplary shapes of the ad-hoc screen in real world.

In a standard manner, the real spatial locations of the devices are projected on a flat plane and the convex hull of the mobile device projected locations is computed. There are a lot of different solutions to define a virtual display area 7, but in most cases a rectangular shape of the virtual display area 7 is preferred. FIGS. 2 and 3 illustrate preferred examples how to determine the virtual display area 7.

In FIG. 2a, the content is clipped to the mobile devices 2, 3, 4, 5 defining the four edges of a rectangle, with the devices arranged regularly. On the other side, the devices in most real situations are not arranged regularly but almost randomly. This is shown in FIG. 2b. After projection the spatial locations of all devices participating in the reproduction into one common plane, a rectangular virtual display area 7 spanned by the projected locations in the plane is determined. One way to do this is to determine the most top, bottom, left and right coordinates of the devices of the group 1. In the illustrated example the devices 2, 3, 4 and 5 define these coordinates, which then define the spanned rectangle shown as dashed line.

Another approach is to fit a rectangle into the plane to span the largest area possible, by firstly fitting a convex hull into the devices' projections in the plane and then to determine the biggest fitted rectangle inside the convex hull 8 as it is shown in FIG. 3. The rectangle of virtual display area 7 is computed by maximizing a rectangle to fit into the outer boundaries given by the locations of the mobile devices 2, 3, 4, 5 of the group 1.

More advanced techniques allow the consideration of the virtual content when partitioning the content. Here, the images and video frames are analyzed and processed with respect to the locations of the devices, especially with respect to the density of the mobile devices 2, 3, 4, 5. As an example, if an image as a virtual content to be reproduced contains larger dark regions, the content parts that are generated by partitioning the virtual image are determined such that the reproduced image's position is aligned in a way that the dark regions coincide to regions with less density of mobile devices 2, 3, 4, 5. This can be done by, e.g., calculating the histograms of the original image (virtual content) and a histogram of a potentially reproduced image mapped on the distribution of devices. The partitioning is performed for different mappings, i.e. for different positions of the reproduced image relative the devices of the group 1. For each of these potential results of partitioning, a histogram is calculated. The distance of these histograms from the histogram of the virtual content to be reproduced can be computed using the Euclidean distance or earth's mover distance (EMD). Thus, by varying the position of the to be reproduced virtual content relative to the virtual display area 7, the position and consequently the partitioning of the content can be optimized. The position for which the distance of the histogram is smallest is finally used for reproduction.

Another variant is to model the density by means of a cluster model, e.g. a mixture of Gaussians. The distance between the mixtures can be computed by the difference between the cluster centers (e.g. Gaussian center points). Using the distances an optimization algorithm is implemented to optimally map the virtual content on the distribution of mobile devices 2, 3, 4, 5.

But it is not only possible to optimize the relative position of the virtual content to the entirety of reproducing devices but also to optimize the location of devices within the virtual display area 7. In order to enable a user who holds a device of the group 1, markers can be visualized on the mobile device's display provided by the central processing unit to motivate the user to move in a certain direction to improve the distribution of devices for a better content mapping. In order to generate such marker's information from the mapping process, namely the influence of a particular device's influence on the change of the histogram is used. As alternative to visual markers, vibration of mobile devices is utilized.

Figure 4A:
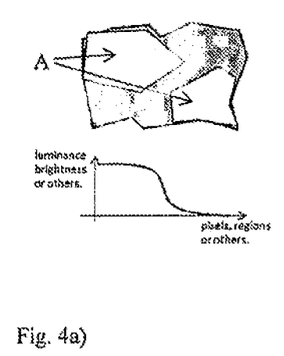
Figure 4B:
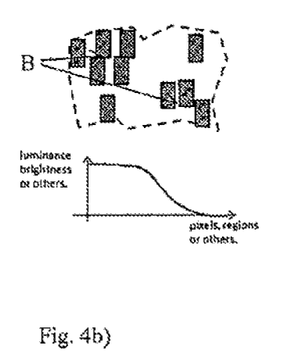
Figure 4C:
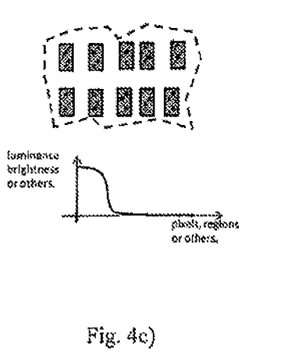

FIGS. 4a), 4b) and 4c) illustrate the mapping process. FIG. 4a shows a given visual content, e.g. images, video, where regions A contain more interesting content and where interestingness could be local structure frequencies (e.g. computed by Fourier transform), brightness, colorfulness, luminance etc. FIG. 4b) shows a distribution of mobile devices 2, 3, 4, 5 in the virtual display area 7. Regions B have a higher density of mobile devices 2, 3, 4, 5. The position of the virtual content of FIG. 4a) shall therefore be positioned such relative to the virtual display area 7, that less interesting areas in the virtual content would be reproduced in regions with a low density of mobile devices 2, 3, 4, 5 (regions outside regions B in FIG. 4b). Finally, FIG. 4c) shows equally distributed mobile devices 2, 3, 4, 5. Below the illustrations of the virtual image and the distributions of the devices, corresponding histograms are shown. It can be recognized from these histograms that the distribution of devices in the middle scenario is advantageous since it displays more visually interesting content. A computation of Euclidian distance or earth mover's distance between the left-middle and left-right histograms results in a better value for the left-middle histogram. Thus, on the devices in the right distribution shown FIG. 4c, markers could be visualized that motivate the users of the devices to change their position. As a result, the distribution would approach the distribution shown in FIG. 4b).

Figure 5A:
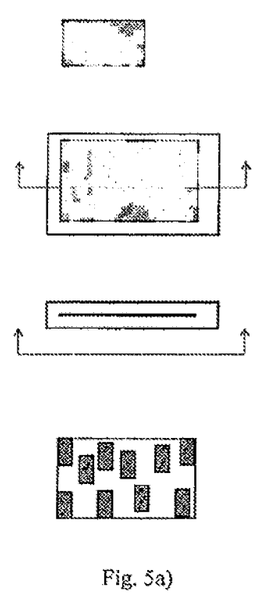

Depending on the application scenario, it is advantageous to apply a pre-processing step on the mobile device locations before computing the distribution of the content. In cases where the mobile devices are arranged on a flat plane as shown in FIG. 5a) the pre-processing step is skipped and the depth coordinate is ignored as long as it is below a specified threshold, i.e. all mobile devices which are not within the threshold are ignored for the large ad-hoc screen. For scenarios where the real-world geometry layout is important for the shape of the large ad-hoc screen, the shape of the layout is stored as virtual representation beforehand and the locations of the mobile devices are mapped on a flat plane using the virtual representation. Afterwards, the partitioning of the virtual content is computed and the content parts are sent to the devices.

Figure 5B:
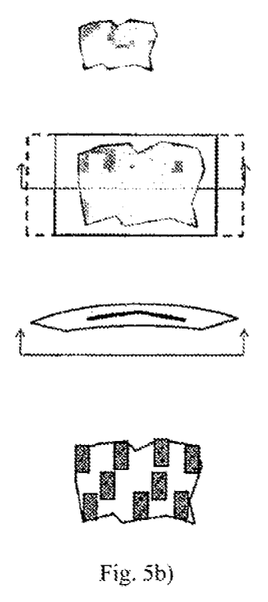
Figure 5C:
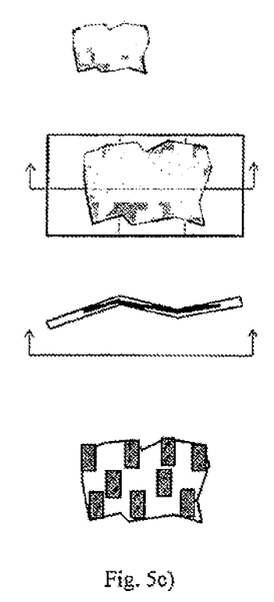

As an example, for stands in a stadium or indoor arena, the cylindrical geometry of the stands as shown in FIG. 5b) has to be known to allow the computation of participating mobile devices 2, 3, 4, 5, i.e., if a mobile device 2, 3, 4, 5 is within a specified threshold for a distance of the device from the virtual display area 7. For these cases the spatial locations of the mobile devices 2, 3, 4, 5 are computed, these locations are then mapped using a virtual representation of the real-world geometry, the mapped locations are verified to be below a specified threshold for successful registration, the virtual content is partitioned for the successfully registered devices and finally distributed. The expression "successfully registered" means that the entirety of registered devices forms the group 1 of devices. The cylindrical shape is only one example and the same approach is valid even for arrangements with a more complex shape like the arbitrary one shown in FIG. 5c).

Depending on the arrangement of the mobile devices 2, 3, 4, 5 an intermediate step may be introduced which measures the distribution density of the mobile devices and may exclude mobile devices in areas of low density. Because singular mobile devices 2, 3, 4, 5, which have a large distance to other mobile devices 2, 3, 4, 5 may reduce the overall experience of the large ad-hoc screens since they introduce areas where no content is displayed. Based on the distribution of content, the content is transmitted to each mobile device 2, 3, 4, 5 and reproduced.

It is desired to have a synchronous transmission, especially when video or audio content is involved. The network time protocol can be utilized advantageously, or in case of available GNSS signals, the global time provided through these signals. Timing information is added to the content parts that are transmitted to the devices so that each device will reproduce its dedicated content part synchronously with the other devices based on this information. Thus, different parts of a video, for example, are played back synchronously.

The full adaptivity of the large ad-hoc screen established by the devices of the group 1 is achieved by repetitively checking the current locations of the devices of the group 1 but also of devices, which are requesting for participation in the ad-hoc display. In some situations, it can be assumed that either the location of a device of the group 1 is rather stationary or a large change of location occurs. This might be the case if a visitor leaves the stadium for example. But even in such a case regularly repeating the localization of the device is necessary to determine whether the device's position has changed to such an extent that it left the virtual display area 7.

On the other side, new mobile devices 2, 3, 4, 5 might request for participating. When such a request is made, or when one mobile device 2, 3, 4, 5 close to the edge of the virtual display area 7 leaves the group 1, the virtual display area 7 might need adaptation. Thus, when from observation of position changes a change of the virtual display area 7 is determined to be necessary, the above explained determination of the virtual display area 7 and partitioning of the content is repeated.

These change events can be triggered by mobile devices 2, 3, 4, 5, which enter or leave the virtual display area 7 of the large ad-hoc screen. In case mobile devices 2, 3, 4, 5 of the outer boundary of the area change, it is required to recalculate the outer boundaries of the large ad-hoc screen and adjust the content parts, which are sent to the mobile devices 2, 3, 4, 5, i.e., new devices entering may also increase the ad-hoc screen area and devices leaving may reduce the ad-hoc screen area. In case mobile devices inside the area change, the density of the mobile devices 2, 3, 4, 5 is compared to a specified density threshold. If the number and distribution of mobile devices 2, 3, 4, 5 is sufficient, these devices belong to the group 1 and the devices are considered when the virtual content is partitioned and transmitted. If the density is not sufficient, the outer boundaries of the large ad-hoc screen are adjusted, the partitions updated and sent to the devices. A continuous change of the boundaries can be avoided by specifying a sufficiently large threshold and/or positioning static mobile devices at specified outer boundaries.

It is to be noted, that the above given explanations all use the example of visual content to be reproduced. But as mentioned in the introductory portion already, the invention is also suitable for reproducing audio content or a combination of audio and visual content. The partitioning of audio and video content in case of a combination thereof as virtual content may be done individually as long as the time relation is maintained.

Audio content may be available on separate audio tracks, e.g. separated as guitar, bass, drums, vocals etc. is distributed to specific locations, e.g. guitars to left side of the screen, drums in the middle part and bass to the right part.

In case audio content is conveyed, the arrangement of multiple devices allows the usage of techniques for beamforming and wave field synthesis using the built in speakers of the mobile devices. The former one is able to modulate the perceived sound quality, e.g. it is possible to increase the perceived loudness at a certain location while decreasing the loudness in another location. In both cases, the content parts are generated from the virtual (audio) content that shall be reproduced based on the spatial location determined for an individual device in the group 1. Doing so, it is also possible to reduce effects of sound artifacts due to reflections by taking the input of the microphones into account. By means of microphone measurements, the sound characteristic of the environment can be estimated, and, thus, the emitted audio modified accordingly to, for example, reduce reflection effects.

Wave field synthesis is based on the Huygens-Fresnel principle. This principle states that any arbitrary wave front can be described by a superposition of spherical waves. With it it is possible to generate virtual sound sources or virtual acoustic environments.

Both audio beamforming and wave field synthesis are favorable extension to this invention for altering the emitted audio signal in order to improve the sound quality or shape the perceived audio impression to generate audio impression impossible by single or unsynchronized devices.

Figure 6:
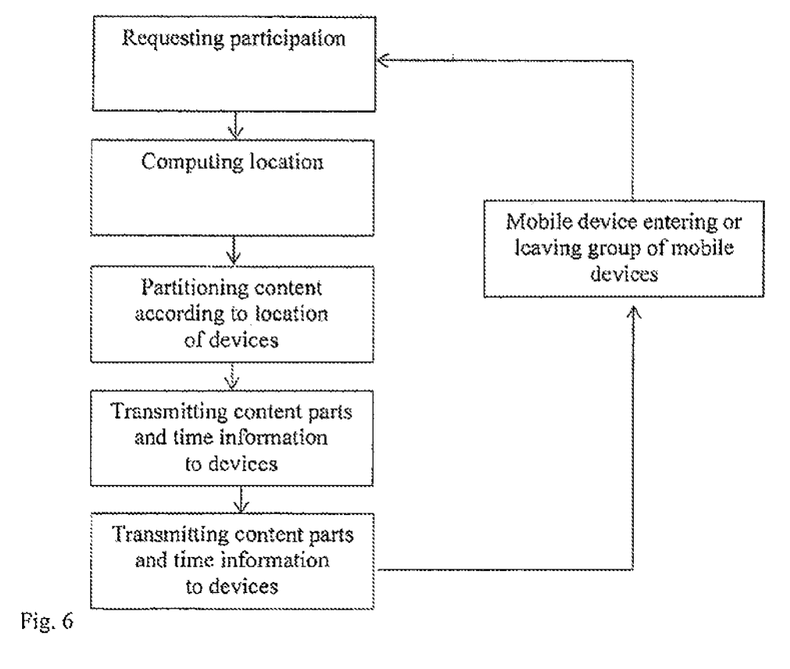
FIG. 6 shows a simplified flowchart with the main method steps.

FIG. 6 finally show a flowchart, summarizing the method steps that have in detail been described before.

The invention claimed is:

1. Method for reproducing visual or audio data synchronously by a group of devices, the method comprising:
   determining a spatial location of each of the devices of the group,
   partitioning the visual or audio content into content parts, each content part dedicated to be reproduced by one device of the group respectively based on the spatial location of the device,
   transmitting the dedicated content parts to their associated devices together with a time stamp, and
   reproducing the transmitted portions commonly and synchronously by the group of devices,
   wherein a distribution of the devices of the group is analyzed and the partitioning of the visual content is mapped to the distribution such that at least one feature of the visual content to be reproduced is optimized, and
   wherein the feature of the visual content is computed based on histograms or cluster model of one or more of local structure frequency, brightness, luminance or colors of the visual content and the optimization is performed towards cluster or histogram similarity.

2. The method according to claim 1, wherein the step of partitioning the visual or audio content is performed repeatedly whenever a device joins or leaves the group.

3. The method according to claim 1, wherein the visual or audio content is one of the following: an image, a video, an audio recording, a 3D object file or a virtual 3D space.

4. The method according to claim 1, wherein the determination of the spatial location of each of the devices of the group is performed based on images shot by built-in cameras of the devices.

5. The method according to claim 4, wherein the images shot by the built-in cameras of the devices include one or more markers a location of which is known, and that the determination of the spatial location is performed based on the markers in the images.

6. The method according to claim 4, wherein each device shooting images for position determination transmits these images to a central processor, the central processor computes the spatial locations of the devices and sends back location information to the devices.

7. The method according to claim 4, wherein after an initial determination of the spatial location is made, an update or refinement of the spatial location is performed based on data recorded by an inertial measurement unit (IMU) of the device.

8. The method according to claim 4, wherein the determination of spatial locations of the devices based on images taken by the built-in cameras of the devices is based on computation of an essential matrix or fundamental matrix by applying at least one of an eight-point algorithm, a five-point algorithm, RANSAC, bundle adjustment and combinations thereof.

9. The method according to claim 4, wherein the determination of spatial locations of the devices based on images taken by the built-in cameras of the devices is based on computation of structure-from-motion algorithms or multi-view geometry algorithms.

10. The method according to claim 1, wherein the determination of the spatial location is performed based on beacons emitted by beacon nodes whose location is known.

11. The method according to claim 1, wherein one dedicated device records at least one image by its built-in camera and registers a local coordinate system and that the at least one image is shared to the other devices of the group which themselves record images taken by their own built-in cameras, wherein each of the other devices computes its spatial position based on the received images, the received local coordinate system and the own recorded images and transmits its spatial location to the dedicated device.

12. The method according to claim 1, wherein the feature of the visual content is computed based on at least one of a local structure frequency, brightness, luminance and colors of the visual content.

13. The method according to claim 1, wherein the cluster or histogram similarity is calculated based on earth's mover distance or Euclidean distance.

14. The method according to claim 1, wherein information on a direction towards the spatial location of the devices that would result in an improved cluster or histogram similarity is transmitted to the devices of the group.

15. The method according to claim 1, wherein a virtual display area is determined which is spanned by the devices of the group and the visual content is partitioned based on the location of the devices within the virtual display area and the size of the devices.

16. The method according to claim 1, wherein a virtual display area is determined which is spanned by the devices of the group and the audio content is partitioned based on the location of the device within the virtual display area.

17. The method according to claim 16, wherein the audio content is music and each part of the audio content corresponds to one instrument.

18. The method according to claim 1, wherein parts of the audio content are individually processed so that audio beamforming or wave field synthesis is achieved by the entirety of the devices of the group.

19. The method according to claim 1, wherein a virtual display area that is spanned by the devices of the group is determined with corner points computed with a convex-hull algorithm.

20. The method according to claim 1, wherein, all of the content parts are transmitted to each of the devices of the group, wherein for each of the content parts information is added that allows identification of an associated device, and each device reproduces its dedicated content part.

21. The method according to claim 1, wherein synchronization of reproduction is based on a network time protocol.

22. System for reproducing visual or audio content synchronously, the system comprising a group of devices and a processor commonly used by the devices, wherein the devices and the processor are configured to execute the method steps of claim 1 with the processor being configured to execute the partitioning.

23. The system according to claim 22, wherein the commonly used processor is included in one of the devices of the group.

* * * * *